United States Patent [19]
Hunter

[11] Patent Number: 4,505,261
[45] Date of Patent: Mar. 19, 1985

[54] MODULAR PASSIVE SOLAR HEATING SYSTEM

[76] Inventor: Billy D. Hunter, R.R. 1, Box 94A, Paso Robles, Calif. 93446

[21] Appl. No.: 562,844

[22] Filed: Dec. 19, 1983

[51] Int. Cl.³ .............................................. F24J 3/02
[52] U.S. Cl. .................... 126/433; 126/443; 126/448; 126/450; 126/437; 165/70
[58] Field of Search ............... 126/432, 433, 434, 443, 126/446, 448, 450, 437; 165/70

[56] References Cited

U.S. PATENT DOCUMENTS

| | | | |
|---|---|---|---|
| 4,162,684 | 7/1979 | Loveless, Jr. | 126/433 |
| 4,217,882 | 8/1980 | Feldman, Jr. | 126/435 |
| 4,299,203 | 11/1981 | Skopp | 126/443 |
| 4,313,423 | 2/1982 | Mahdjuri | 126/433 |
| 4,343,350 | 8/1982 | Campbell et al. | 165/70 |
| 4,356,811 | 11/1982 | de Grijs et al. | 126/433 |
| 4,372,374 | 2/1983 | Lee | 165/70 |

FOREIGN PATENT DOCUMENTS

| | | | |
|---|---|---|---|
| 134248 | 10/1980 | Japan | 126/433 |
| 42058 | 4/1981 | Japan | 126/433 |
| 146951 | 11/1981 | Japan | 126/433 |

*Primary Examiner*—James C. Yeung
*Attorney, Agent, or Firm*—Flehr, Hohbach, Test, Albritton & Herbert

[57] ABSTRACT

A modular passive solar energy storage system comprises a plurality of heat tubes which are arranged to form a flat plate solar collector and are releasably connected to a water reservoir by, and are part of, double-walled heat exchangers which penetrate to the water reservoir and enhance the heat transfer characteristics between the collector and the reservoir. The flat plate collector-heat exchanger disassembly, the collector housing, and the reservoir are integrated into a relatively light weight, unitary structural system in which the reservoir is a primary structural element. In addition to light weight, the system features high efficiency and ease of assembly and maintenance.

6 Claims, 9 Drawing Figures

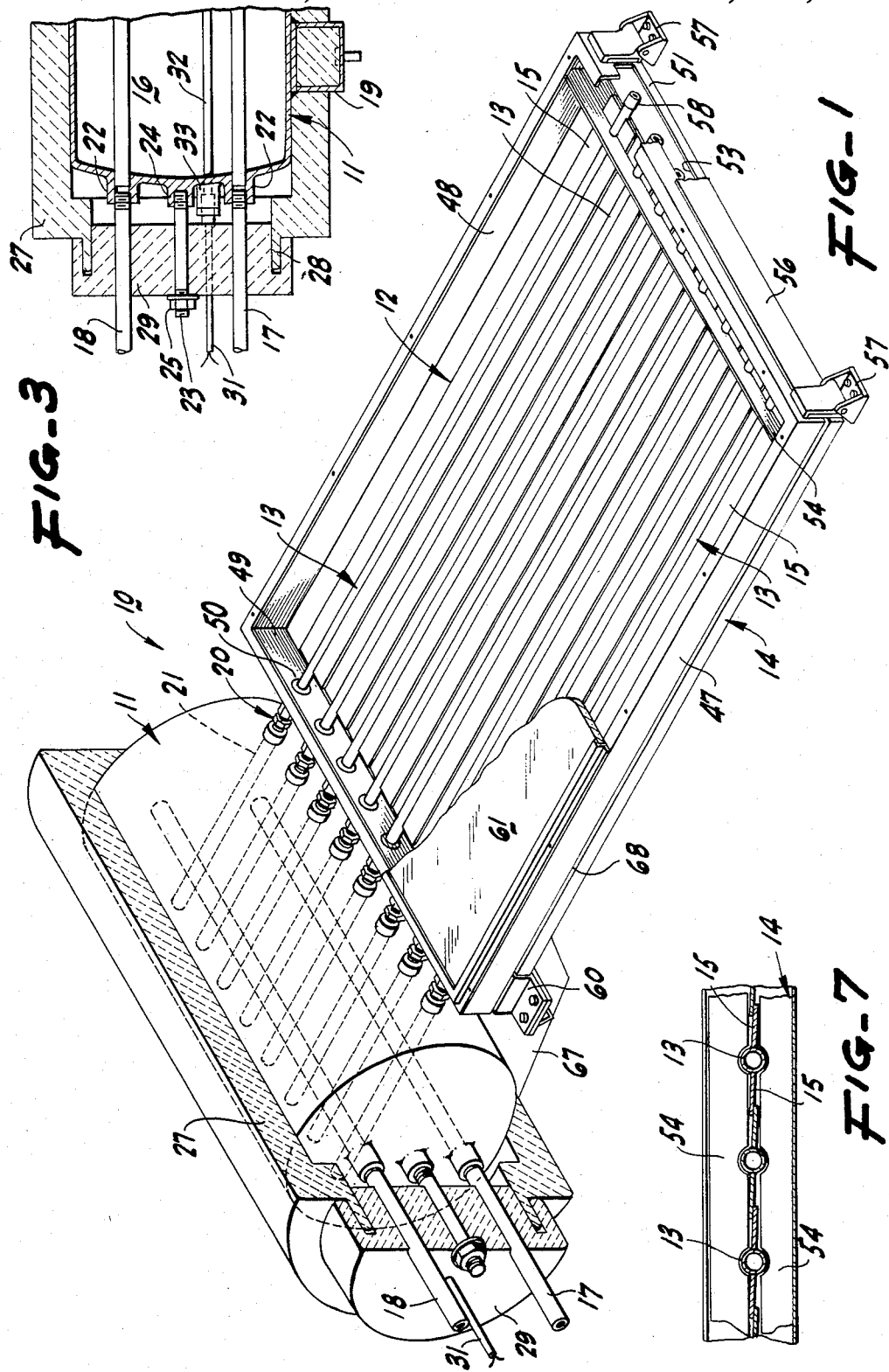

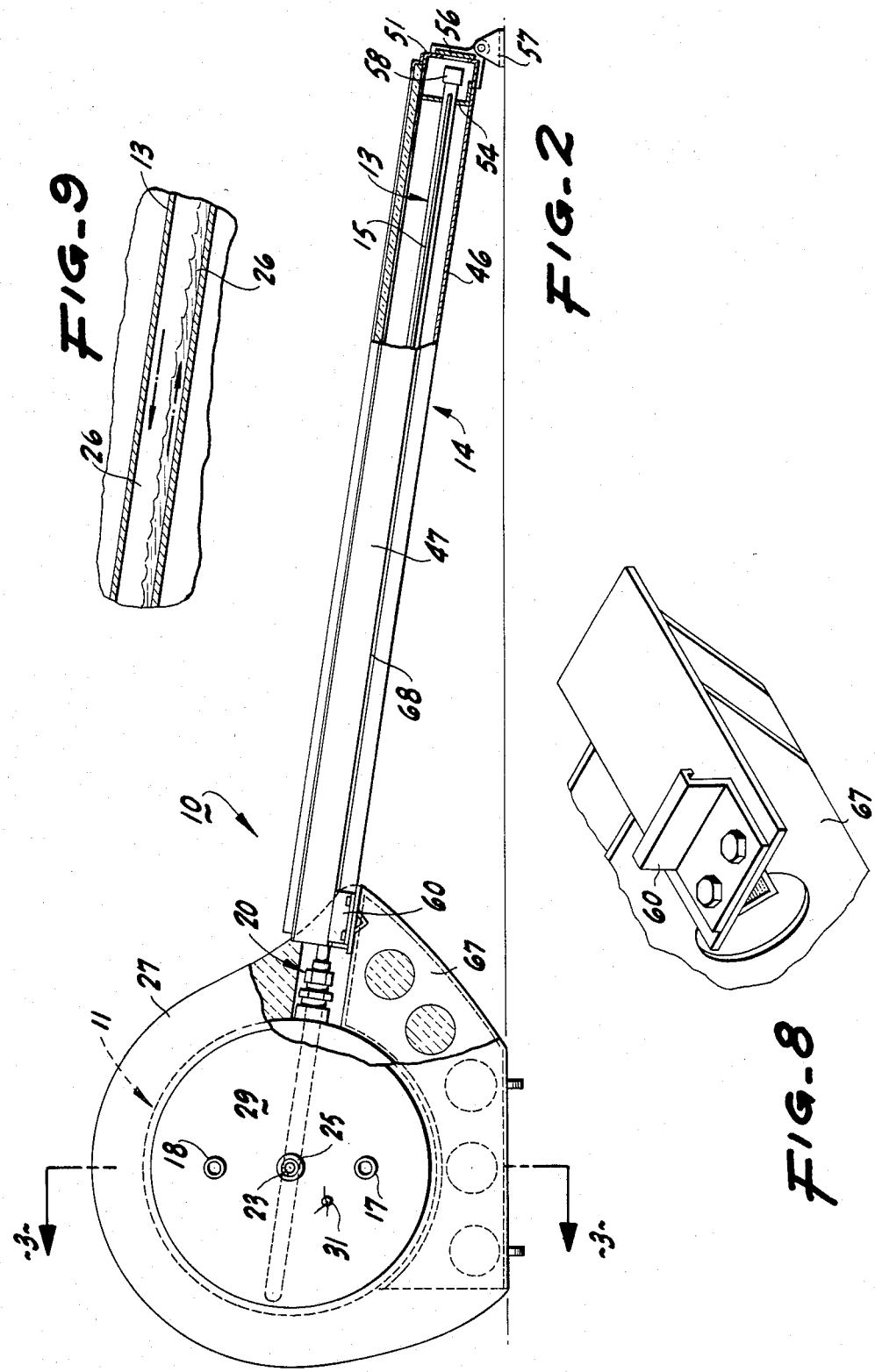

MODULAR PASSIVE SOLAR HEATING SYSTEM

BACKGROUND OF THE INVENTION

The present invention relates to solar heating systems and, in particular, to a modular passive solar heating system which uses a heat pipe or heat tube absorber.

Passive solar water heating systems are well established in the art and are desirable in many applications because of their characteristic lack of need (or minimum requirements) for electric power, controls and pumps. The so-called water thermosyphon may well be the prevalent passive solar water heating system in terms of worldwide usage. In a typical and simple arrangement, the water thermosyphon uses a non-tracking water absorber for absorbing energy in the form of heat from incident solar radiation, then transfers this thermal energy via an inlet manifold to a water reservoir or tank which is mounted on the absorber.

U.S. Pat. No. 4,217,882, issued Aug. 19, 1980, discloses a two-phase thermosyphon which is an improvement over the relatively heavy freeze-susceptible, conventional water thermosyphons. The '882 patent adapts the well known heat pipe or heat tube concept, originally developed approximately twenty years ago, to a tracking parabolic trough concentrator and also to fixed, cylindrical and compound parabolic concentrators. As applied to such embodiments, the heat pipe comprises an elongated, small diameter tube which at one end partially surrounds or penetrates a water tank. The tube is partially filled with a vaporizable working fluid and is supported at a slight incline relative to the horizontal. Incident solar radiation is focused on the tube by the surrounding concentrator structure heats and evaporates the fluid. The resulting vapor rises to the upper, tank end of the heat tube where, due to thermal coupling, the solar heat is transferred from the tube fluid to the tank fluid, which typically is water. Upon giving up its latent heat of evaporation, the condensed working fluid is returned by gravity to the lower, concentrator end of the tube.

The above-described heat tube imparts several advantages to passive solar water heating systems. The heat pipe has excellent thermal conductance in that it has very high heat transfer capability over even a relatively small temperature gradient. In addition, the evaporation-condensation cycle provides highly anisotropic, essentially one-way heat transfer along the tube. It may help understanding to consider the situation at night or during other periods of low incident solar radiation. At such times, there is little or no evaporation and condensation of the working fluid; the fluid in its liquid state pools at the lower, concentrator end of the heat tube. The resulting discontinuity in the conduction path between the absorber/concentrator and the tank essentially eliminates heat loss via the working fluid. The combined result of the excellent thermal conductance characteristics and the one-way heat transfer characteristics is very efficient heat transfer along the heat pipe into the reservoir with little outward heat loss. Other advantages of adapting heat tubes to passive solar collectors, not exhaustive, include relatively light weight; adaptability to freeze protection, since only the reservoir tank contains water; and a high percentage net usable system energy, since little or no parasitic power consumption is required to operate the system.

One known alternative to the '882 system comprises a flat plate collector array of finned heat tubes which wrap around an integral storage tank. The heat tubes and the tank wall in effect comprise a double-walled heat exchanger so that heat is transferred from the working fluid in each heat tube, through the heat tube and tank walls, and into the storage medium.

Despite the above substantial advantages over prior art passive solar water heating systems, heretofore it has not been possible to fully utilize the potential of the heat tube concept. In particular, the unitary heat collector system exemplified in the '882 patent utilizes a relatively complex collector/concentrator which, like the other prior art systems, is integrated with the tank. It is difficult to disassemble all or part of the '882 system or the alternative system for inspection or repair. It is also difficult to use such systems in a primary applications of passive systems, namely roof top applications on residential dwellings. In short, while incorporation of the heat tube technology into solar heat collector systems represents an advance in passive solar energy technology, the potential of heat tube systems for combined simplicity, durability and ease of maintenance has not been fully realized.

SUMMARY OF THE INVENTION

The objects of simplicity, durability and ease of maintenance are realized in my herein-described modular passive solar energy storage system. My system comprises a reservoir for storing heat in a fluid medium such as water, one or more finned heat tube absorbers which are assembled into a flat plate collector system for absorbing incident radiation and heating an evaporizable medium contained therein, and a double-walled heat exchanger which is releasably mounted to and projects into the reservoir and in turn releasably mounts the heat tube absorber for effectively transferring heat stored in the heat tube medium into storage in the reservoir medium. In a preferred embodiment, the heat tube forms the inner wall of the double-wall heat exchanger.

A preferred embodiment of my solar energy storage system also includes a support housing for the flat plate collector which is integrally mounted to the reservoir. The housing is adapted to mount and support the heat tube absorbers in a desired orientation and permits sliding insertion of the heat tubes therethrough into engagement with the heat exchanger. This cooperative, modular structural arrangement is unique in that it incorporates the system reservoir as a primary structural support element in a structure of relatively low weight and excellent structural integrity in which the heat tubes and/or collector housing are easily removed and replaced individually or collectively for inspection, maintenance or repair.

In one preferred structural embodiment, the collector housing comprises a lower base plate having a peripheral wall structure extending upwardly therefrom. Apertures or slots are formed in the wall on opposite ends of the housing so that the finned heat tube absorbers can be inserted into and removed from the heat exchanger and reservoir. A support plate extends between the side walls of the housing substantially transverse to the longitudinal axes of the heat tube absorbers. The support plate has a slot formed therein which has the shape of the transverse cross-sectional profile of the heat tubes. As a result, the plate supports and orients the tubes in an essentially flat array.

BRIEF DESCRIPTION OF THE DRAWINGS

FIG. 1 is an isometric perspective view, partially cut away, of a preferred embodiment of the modular passive solar heating system of the present invention.

FIG. 2 is a side elevation view, partially in cross-section, of the modular passive solar heating system shown in FIG. 1.

FIG. 3 is a longitudinal cross-sectional view of a portion of the tank assembly taken in the direction of the arrows in FIG. 2.

FIG. 7 is an enlarged, partial transverse view of the system of FIG. 1 showing the mounting and orienting of the finned heat tube absorber units within the collector housing.

FIG. 8 is an enlarged segment of FIG. 1 illustrating the tank-to-collector housing mounting brackets.

FIG. 9 is an enlarged segment of the longitudinal cross-section of FIG. 1 schematically showing vapor and liquid flow within a heat tube absorber unit.

DETAILED DESCRIPTION

Figure 4:
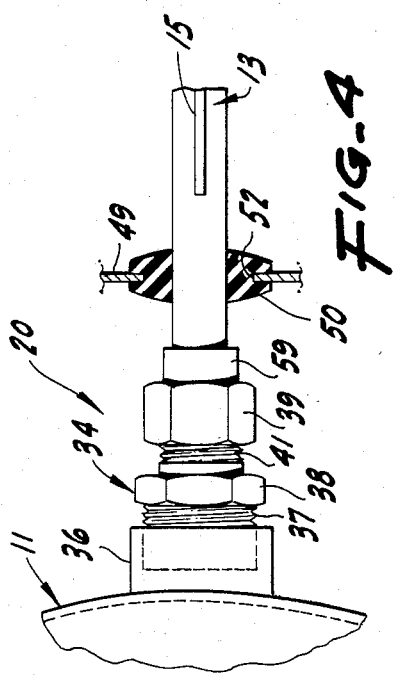
FIG. 4 is an enlarged, partial side elevation view of the modular passive solar heating system of FIG. 1 showing the mounting arrangement for a double-walled heat exchanger and a finned heat tube absorber unit.

FIGS. 1 and 2 illustrate a passive solar heating system which embodies the features of the present invention. The modular system 10 includes a thermal storage reservoir or tank 11 which contains a thermal storage fluid such as water 16 (FIG. 3). Relatively cool water enters the tank and is uniformly distributed within the tank at inlet distribution manifold 17. The water is heated by double-walled heat exchangers 20-20 (the exchangers contain fluid 26, FIG. 9, which is heated by flat plate collector unit 12) then exits the tank via outlet collection manifold 18 and is routed to a utilization system (not shown). The utilization system may be open or closed (sealed). As an example of application to an open system, the inlet manifold 17 receives water from a building water supply and the outlet manifold 18 is connected to a hot water tank so that the system 10 serves as a preheater for the building's hot water system. Alternatively, the manifolds may be connected across the load(s), that is the radiator or other heat exchanger, of a sealed heating system. In such a sealed system, the storage fluid 16 can be water, preferably with appropriate additives to prevent corrosion and to provide freeze protection where desired, or again can be other suitable liquids.

Flat plate collector 12 comprises one or more heat tubes 13-13 having fins 15-15 which are releasably supported and oriented within a collector housing 14. As shown in detail in FIGS. 4, 5 and 6, one end 19 of each heat tube 13 comprises the inner wall or tube of a double-walled structure 19, 21 of a heat exchanger 20 which is releasably inserted into the reservoir/tank 11. The outer tube or dip tube 21 and the heat tube end 19 inserted therein which comprise the heat exchanger 20 penetrate and extend across substantially the width of the interior of the tank 11. As described in more detail below, this arrangement provides excellent heat transfer characteristics between the working fluid 26 such as Freon which is located in the heat tube absorber 13 and the storage fluid 16 in reservoir 11. The composite result of these various features, amplified at appropriate points below, is a modular, easily disassembled passive solar heat tube collector which has excellent heat transfer characteristics, structural integrity and freeze protection capability.

Referring now to FIGS. 1, 2 and 3, the tank 11 is mounted on support brackets 67-67. The tank, typically of steel, is enclosed by a two-piece insulated cover 27 to retain the captured solar energy and to provide freeze protection. In a present working embodiment, the cover 27 is molded polyurethane which has a protective coating of paint. As shown in detail in FIG. 3, both ends of cover 27 can have a projecting circular flange 28 which mounts an insulated removable cap 29. The inlet and outlet manifold pipes 17 and 18 are mounted to the domed end of tank 11 by fittings 22-22, and project through one of the insulated, removable caps. The wiring 31 and an associated optional electric heating element 32 are mounted via fitting 33. The cap 29 is secured to the cover by a threaded rod 23. The rod is itself attached at one end to a nut 24 which is welded to the end of the tank. The rod 23 extends through the end cap 29; a removable nut attached to the other end of the rod holds the cap in place. Removal of end caps 29 allows the protective insulated cover 27 to be split in half and removed for access to the internal components of the tank 11, including the manifold pipes 17 and 18, and the wiring 31. When end caps 29 are in place the protective insulated cover 27 cannot be removed from tank 22.

Figure 5:
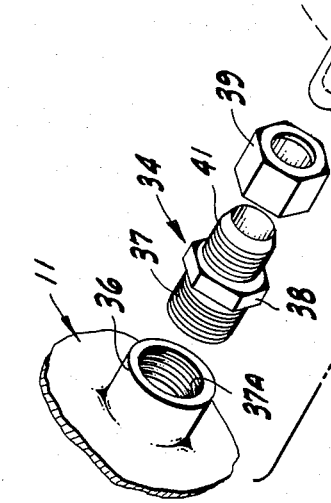
FIG. 5 is an exploded perspective view of the double-walled heat exchanger and the finned heat tube absorber unit showing additional details of their mounting to the tank.

As shown in FIGS. 4 and 5, each double-walled heat exchanger 20 and, in particular, outer tube 21 thereof is removably connected to the tank 11 by tube fitting 34 and receptacle 36. The assembly of the heat tube 13, double-walled heat exchanger 20 and tank 11 is shown in exploded perspective in FIG. 5. The receptacle 36 is welded or otherwise secured to tank 11. Both the tube fitting 34 and the receptacle 36 have longitudinal bores therein which permit insertion (and withdrawl) of the outer tube 21 and the assembled heat exchanger 20 into the tank interior. A threaded outer diameter at tank end 37 of the tube fitting 34 permits attachment of the fitting to the receptacle 36 via corresponding threads 37A on the internal bore of the receptacle. Lock nut 38 secures the fitting 34 to receptacle 36. The finned heat tube 13 and outer tube 21 are assembled by inserting sealed end 19 of the heat tube into enlarged outer end 59 of tube 21, to form the double-walled heat exchanger assembly 20. The assembled heat exchanger 20 is then inserted through rubber grommet 50 stationed in the housing wall 49 and through the tube fitting 34 and the receptacle 36 and into the tank 11 so that the enlarged section 59 of tube 21 is positioned in registration with threads 41 of fitting 34, as shown in FIG. 4. The standard tubing compression nut and ferrel 39 is then threaded onto tube fitting threads 41 so that the fitting 34 securely engages tube end 59. This releaseably secures the tube 21 and the heat exchanger 20 assembly to the fitting 34 and thereby to the tank 11.

It should be noted that the internal bore of fitting 34 can have a single-dimension inside diameter (I.D.) which corresponds to the outside diameter (O.D.) of the enlarged end 59 of outer tube 21. Alternatively, the I.D. of the fitting 34 can be stepped to correspond to the O.D. of 21 and 59. The stepped configuration facilitates positioning the heat exchanger 20 within the fitting 34. This configuration also facilitates inserting the outer tube 21 into the fitting 34 without the heat tube 13 being assembled thereto (see below regarding swedging), and makes it more convenient to remove the heat tube 13 from the system 10 (for maintenance, replacement or the like), while leaving the outer tube 21 in place.

Figure 6:
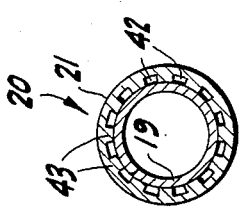
FIG. 6 is an enlarged transverse cross-sectional view of the double-walled heat exchanger taken in the direction of the arrows in FIG. 5.

As shown in FIGS. 5 and 6, the outer tube 21 has a grooved inner surface except at the enlarged section 59. Ribs 43-43 engage the end 19 of heat tube 13. Grooves 42-42 defined between ribs 43-43 vent the interior of the heat exchanger assembly 20 via enlarged tube section 59 to the ambient. This is a safety feature, in that refrigerant 26 leaks are vented or drained outside rather than inside tank 11. The ribs 43-43 also provide good thermal contact between the outer tube 21 and the inner tube 19. Good fit and thermal contact between the inner and outer tubes can be increased by swedging the smaller diameter, forward section of outer tube 21 onto inner tube 19. When swedging is done, heat tube 13 cannot be removed from outer tube 21. Tube ends of both 19 and 21 can be sealed shut by spinning in a hemispherical dome-configured mold.

The tank 11-double-walled heat exchanger 20-heat tube 13 assembly has the low weight, excellent heat transfer characteristics and efficiency, and the other beneficial characteristics of heat tube absorbers described previously. In addition, the use of the double-walled, two-phase heat exchanger 20 optimizes thermal transfer into the reservoir. The quick-release connection of the heat tube, heat exchanger and tank permits selective removal of the heat exchanger and the heat tube for inspection, maintenance or replacement. This is a decided advantage, particularly in roof top installation, over prior art collectors which require removal of the entire collector or collector panel.

The collector housing 14 shown in FIGS. 1 and 2 comprises a base 46 which supports opposite, upwardly extending side walls 47 and 48 and end walls 49 and 51. The top of the housing may be open but preferably has a protective, optically transparent cover 61 of glass or other suitable material. The opposite end walls 49 and 51 have holes 52 and a slot 53 formed therein which permit sliding insertion of the finned heat tube absorbers 13. A support plate 54 extends across the housing 14 proximate the front end thereof (the end opposite the tank end) and has a longitudinal slot formed to correspond to the cross-sectional profile and desired orientation of the heat tube absorbers 13. Plate 54 supports, separates and orients the individual heat tube absorbers 13. Thus, as shown in FIG. 7, the finned heat tube absorbers 13 can be mounted with the fins in parallel arrangement, forming a horizontal flat plate collector. The collector housing 14 also removably mounts an end-plate 56 between the end wall 51 and collector support brackets 57-57, as by clips (not shown). With the end-plate 56 removed, individual ones or all of the heat tube absorbers 13-13 can be removed from the solar system 10. With the plate 56 in place, the tubes 13 cannot be removed.

As shown in the side view of FIG. 2 as well as in FIG. 1, the modular passive solar heating system 10 is mounted on the ground, on a roof, etc. by tank brackets 67-67 and the previously mentioned collector brackets 57-57. The tank brackets 67-67 are rigidly affixed to the collector housing 14, by brackets 60-60 which mate with grooves 68-68 in the housing side walls 47 and 48. The tank support brackets 67-67 are also rigidly secured to the tank 11, as by welds. Outstanding structural integrity and rigidity is provided by the cooperative combination of the tank support brackets 67-67, the collector housing 14 and the tank 11. As will be appreciated by those skilled in the art, the relatively small, light weight heat tubes 13-13 permit the use of the tank as a primary structural element for the collector housing 14 and, in turn, the simplified, combined mounting arrangement further contributes to the light weight and structural integrity. In addition, the precise angulation of the tank mounting brackets 67-67 permits mounting the system 10 on a pitched roof or on truss supports.

As shown in FIG. 1, each heat tube 13 is capped by a valve 58. The valves 58-58 are Schrader refrigeration valves, and are used to charge each heat tube absorber 13 with a specific volume of refrigerant 26. Typically the tube 13 is filled via its valve 58 with an amount of refrigerant which is established by internal tube volume, fin configuration, fin material and fin coating. As will be appreciated, the releasable mounting used in the present collector system 10 permits the charging and venting of individual tubes prior to assembly into the collector system, and permits removal of the individual tubes for recharging or inspection.

Operation of the collector system 10 can be conveniently explained with reference to FIGS. 1 and 2. Solar radiation incident on the flat plate collector assembly 12 heats the working fluid 26, which initially is in its liquid phase at the lower end of the collector housing. The housing may be slightly inclined or at high angles, such as 45°, to the horizontal. Upon absorbing its latent heat of vaporization, the working fluid/refrigerant evaporates and rises to the heat exchanger 20 at the tank end of the inclined heat tubes 13, as shown by the leftward-directed arrow in FIG. 9. Water 16 entering the tank via distribution manifold 17 is heated by the heat exchanger 20 and is then transported out of the tank via exit collection manifold 18 to a utilization system such as a hot water heater or radiator. In transferring its heat of evaporation to the tank water 16, the refrigerant 26 condenses to its liquid phase and is returned by gravity to the lower or evaporator section of the heat tube where the heating-evaporation-cooling-condensing cycle is repeated.

A working embodiment of the modular passive solar heating system 10 uses a collector housing 14 measuring approximately thirty-five inches by ninety-seven inches, which accommodates the installation of the removable heat tubes 13, double-walled heat exchangers 20 and thermal storage reservoir 11. The flat plate collector 12 comprises eight copper heat tubes 13 which are approximately 116 inches long, have a 0.5 inch O.D. and have metallic (copper) fins measuring four and one-half inches by ninety-five inches extending from opposite sides thereof. The tubes 13 are coated with a selective black paint to increase solar radiation absorption and decrease emission. Each tube is charged via Schrader valve 58 with Freon refrigerant. The assembled tubes form a three feet by eight feet flat plate collector array 12. The outer heat exchanger tubes 21 are copper tubes which are approximately nineteen inches long, and have a 0.59 inch O.D. The tubes 21 are mechanically formed to have the illustrated ribbed and grooved I.D. and an enlarged end 59 of 0.625 inch O.D. Spin-sealing is used to close tube ends 19 and 21. The tank 11 is thirty-four inches long and eighteen inches in diameter, providing a 37.5 gallon capacity. The tank insulation is molded polyurethane, three inches thick, which provides an insulation value of R-24. The base and peripheral walls of the collector housing 14 are insulated with 1.25 inches of polyurethane, which provides an insulation value of R-10. The maximum temperature during operation is about 150° F. This maximum operating temperature occurs when the refrigerant 26 is fully vaporized. When filled with approximately 37 gallons of water, the above system weighs about 475 lbs.

Thus, there has been described a modular, passive, two-phase solar heating system which has numerous advantages and capabilities. To summarize, the system embodies the outstanding heat conductance characteristics and efficiency of heat tube collectors. The system possesses the advantages of passive collector system in regard to the lack of need for electric power, controls, pumps and the like, the resulting lack of parasitic power requirements, and enhanced maintenance and simplicity of operation. Unlike conventional passive water thermosyphons, the present collector system is freeze resistant. Preferably, the evaporable heat tube fluid is selected from among the many available fluids which do not freeze at the normal ambient temperature extremes. The system eliminates the use of water in the absorber/collector system. In addition, the reservoir or tank 11 is provided with insulation and can be fitted with the back-up pre-heater 32, e.g., to establish a minimum system thermal output when the sun is not shining sufficiently. Regarding freeze resistance, in closed systems it is of course possible to use freeze-resistant fluids or to incorporate any additional anti-freeze capability which is required over and above the inherent system capability for water or other freezable liquids. In any event, the insulated cover 27 greatly reduces freeze susceptibility. The removable double wall heat exchanger-heat tube assembly which is vented to the atmosphere provides ease of assembly and maintenance as well as excellent heat transfer characteristics. In addition, the use of a heat exchanger which penetrates the diameter of the tank, rather than contacting the periphery of the tank, provides a lower system profile. Finally, but not to exhaustively recite the advantages, the use of the tank 11 as a primary structural element and the cooperative structural arrangement of the tank, mounting brackets and heat tube collector housing provides a light weight system which nonetheless has great structural strength and integrity, without the use of additional structure, e.g., to meet wind load requirements.

Having thus described the preferred embodiment of my modular passive solar heating system, what is claimed is:

1. A passive solar energy storage system comprising:
   a tank for releasably storing heat in a fluid such as water contained therein;
   at least one heat tube for releasably storing radiant energy incident thereon as heat in a vaporizable fluid contained therein and having at least one axial heat collector fin;
   a double-walled heat exchanger comprising first and second tubes, the first tube being releasably mounted to and extending into the interior of the tank and itself being adapted to slidably receive the heat tube as the second tube thereof for transferring heat stored in the vaporizable heat tube fluid to the reservoir fluid medium;
   the double-walled heat exchanger having at least one channel formed between the first and second tubes for venting the interior space to the ambient;
   a heat tube housing comprising a lower base having a peripheral wall structure extending upwardly therefrom, the housing forming a unitary structural system with the tank such that the tank provides structural support to the housing; and
   the housing having first and second oppositely situated openings formed in the wall structure for receiving the heat tube, and further comprising a support plate extending transverse to the heat tube and having a profile corresponding to the transverse cross-section outline of the finned heat tube for supporting the heat tube in a selected orientation and for permitting sliding insertion of the heat tube into and removal of the heat tube from the tank.

2. The system of claim 1, wherein the heat tube further comprises a valve affixed to the end thereof spaced from the reservoir for supplying an operative quantity of evaporable medium.

3. The system of claim 1 further comprising a plurality of brackets rigidly interconnecting the tank to the housing and being adapted for supporting the system on an external surface.

4. A modular passive solar energy storage system comprising:
   a reservoir for releasably storing heat in a fluid such as water contained therein; at least one heat tube for releasably storing radiant energy incident thereon as heat in a vaporizable fluid contained therein and having at least one heat collector fin extending longitudinally along one side thereof;
   a double-walled heat exchanger comprising first and second tubes, the first tube being releasably mounted to and extending into the interior of the reservoir and itself being adapted to slidably mount the heat tube as the second tube thereof for transferring heat stored in the vaporizable heat tube fluid to the reservoir fluid medium, the double-walled heat exchanger having at least an axial groove formed between the first and second tubes for venting to the ambient;
   a heat tube housing; and
   mounting bracket means connected to and forming a unitary structural system with the reservoir and housing such that the reservoir provides structural support to the housing, the housing being adapted to support and align the heat tube or plurality of heat tubes.

5. A modular passive solar energy storage system comprising:
   a reservoir for releasably storing heat in a fluid such as water contained therein; at least one heat tube for releasably storing radiant energy incident thereon as heat in a vaporizable fluid contained therein and having at least one heat collector fin extending longitudinally along one side thereof;
   a double-walled heat exchanger comprising first and second tubes, the first tube being releasably mounted to and extending into the interior of the reservoir and itself being adapted to slidably mount the heat tube as the second tube thereof for transferring heat stored in the vaporizable heat tube fluid to the reservoir fluid medium, the double-walled heat exchanger having at least an axial groove formed between the first and second tubes for venting to the ambient; and
   a heat tube housing mounted to and forming a unitary structure with the reservoir, the housing comprising a lower base having a peripheral wall structure extending upwardly therefrom and an optically transparent upper base;

the housing having first and second oppositely situated apertures formed in the wall structure for receiving a plurality of heat tubes, and further comprising a support plate extending substantially transverse to the heat tubes and having a support profile corresponding to the transverse cross-section outline of the heat tubes for supporting and orienting the said heat tubes in a substantially flat array.

6. The solar energy storage system of claim 5 wherein the heat tube further comprises a valve affixed thereto for supplying an operative quantity of evaporable medium and for venting the heat tube.

* * * * *